(12) United States Patent
Adler et al.

(10) Patent No.: US 6,551,369 B1
(45) Date of Patent: Apr. 22, 2003

(54) CERAMIC FLAT MEMBRANE AND METHOD FOR PRODUCING THE SAME

(75) Inventors: Jörg Adler, Meissen (DE); Reinhard Lenk, Grossschönau (DE); Hans-Jürgen Richter, Dresden (DE); Regina Stockmann, Dresden (DE); Daniel Tocha, Dresden (DE); Norbert Stroh, Magstadt (DE); Stefan Tudyka, Ludwigsburg (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/856,496

(22) PCT Filed: Dec. 3, 1999

(86) PCT No.: PCT/EP99/09478

§ 371 (c)(1),
(2), (4) Date: Dec. 3, 2001

(87) PCT Pub. No.: WO00/35561

PCT Pub. Date: Jun. 22, 2000

(30) Foreign Application Priority Data

Dec. 14, 1998 (DE) ........................ 198 57 590

(51) Int. Cl.⁷ ................... B01D 29/07; B01D 46/12
(52) U.S. Cl. .............. 55/521; 55/523; 55/524; 55/DIG. 5
(58) Field of Search .............. 55/521, 523, 524, 55/527, DIG. 5

(56) References Cited

U.S. PATENT DOCUMENTS

| | | | |
|---|---|---|---|
| 2,267,918 A | * 12/1941 | Hildabolt | 55/523 X |
| 3,785,781 A | 1/1974 | Hervert et al. | |
| 3,978,248 A | 8/1976 | Usami | |
| 4,652,286 A | * 3/1987 | Kusuda et al. | 55/523 |
| 5,322,537 A | * 6/1994 | Nakamura et al. | 55/523 |
| 5,569,455 A | 10/1996 | Fukui et al. | |
| 5,683,528 A | 11/1997 | Partlow et al. | |
| 5,766,290 A | 6/1998 | Zievers et al. | |
| 5,766,299 A | 6/1998 | Miller | |
| 5,780,126 A | 7/1998 | Smith et al. | |
| 5,908,480 A | * 6/1999 | Ban et al. | 55/524 X |
| 6,379,407 B1 | * 4/2002 | Blackwell et al. | 55/523 X |

FOREIGN PATENT DOCUMENTS

| | | |
|---|---|---|
| DE | 2208767 | 5/1984 |
| DE | 3612825 | 10/1986 |
| DE | 4329473 | 8/1994 |
| DE | 4335122 | 4/1995 |
| DE | 19512146 | 10/1996 |
| DE | 19624176 | 5/1998 |
| EP | 0574012 A2 | 12/1993 |
| EP | 0574012 A3 | 12/1993 |
| JP | 58-30306 | 2/1983 |
| WO | 90/15661 | 12/1990 |
| WO | 96/30207 | 10/1996 |
| WO | 98/28060 | 7/1998 |
| WO | 00/35558 | 6/2000 |

OTHER PUBLICATIONS

R.R. Bhave, Characteristics and Application, VanNostrand Reinhold, New York, 1991, pp. 20–21,24–25, and 30–31.

Arian Nijmeijer et al., "Centrifugal Casting of Tubular Membrane Supports", The American Ceramic Society Bulletin, 77(4), pp. 95–98 (1998).

* cited by examiner

Primary Examiner—Robert H. Spitzer
(74) Attorney, Agent, or Firm—Greenblum & Bernstein, P.L.C.

(57) ABSTRACT

The invention relates to the area of ceramics and to a ceramic flat membrane which is configured as a multi-channel element. The aim of the invention is to provide a ceramic flat membrane with a larger effective membrane surface. To this end, the inventive ceramic flat membrane consists of at least two layers of at least two sub-layers of different porosity, at least one of these layers having a non-planar geometry. The two layers are joined to each other with at least spot joins and integral joins. The invention also provides a method for producing a flat membrane of this type. According to this method, suspensions are produced from at least two ceramic powders of different particle size. Two sub-layers are formed from the suspensions, then dried and joined to form one layer. At least one layer which is embossed and sintered, or unsintered is joined to a non-embossed, similarly embossed, differently embossed or differently structured, sintered or unsintered layer with at least spot joins and integral joins to form a flat membrane.

51 Claims, No Drawings

CERAMIC FLAT MEMBRANE AND METHOD FOR PRODUCING THE SAME

BACKGROUND OF THE INVENTION

1. Field of the Invention

The invention relates to the field of filter and separation technology and ceramics and concerns a ceramic flat membrane, for example, in the form of a multichannel element for use in fluid and gas filtration, and a process for producing this membrane. Multi-channel elements of this kind are preferably used in the form of filter modules which are comprised of a number of multi-channel elements.

2. Discussion of Background Information

There are ceramic membranes for filtration applications, which have flat geometry and tubular geometry. These membranes have as high as possible a ratio of surface area to volume. In membranes with a tubular geometry, both single-channel and multi-channel elements are possible. With tubular multi-channel elements (e.g., 7 or 19 channels), a considerably higher ratio of surface area to volume is achieved than with single-channel elements. By increasing the number of channels to 37, for example, the usable filtration surface area can be increased further. With a constant outer diameter of the tube, however, the number of channels cannot be increased to arbitrarily high numbers because otherwise the wall thicknesses become too thin and consequently, the mechanical stability is no longer sufficiently assured. In addition, with an increasing number of channels, it becomes more difficult to transport the permeate from the inner channels, through the ceramic toward the outside. For tubular geometries, the ratio of surface area to volume can also be increased by changing the conventional concentric channel cross-sectional forms into a cloverleaf or butterfly shape.

The conventional tubular single-channel and multi-channel elements are produced in one piece by using extrusion.

Centrifuging is a new technique for producing single-channel elements which have a very low roughness and are therefore well-suited for membrane coating (Nijmeijer, A., et al, Am. Ceram. Soc. Bull. 77(4), pp. 95–98, 1998).

The actual separation membrane is applied in a subsequent step, e.g., using a single or multiple wetting of the tube with a suspension containing ceramic powders or with a precursor solution. Independent of the chemistry and composition of the precursor, the separation membrane is disposed on the inside of the tubular channel or channels.

In addition to membranes using tubular geometry, there are also flat membranes. Flat membranes of this kind are disclosed in WO 98/28060 A1, DE 36 12 825 A1, and DE 196 24 176 C2. All of these flat membranes are characterized by a planar surface. In addition, in fluid filtration, they must be very thin in order to assure a sufficient filtrate flow. Due to the relatively low mechanical stability of thin ceramic membranes, a porous support is required whose thickness is more than 100 times greater than the thickness of the membrane layer.

DE 43 35 122 A1 describes a ceramic flat membrane which is comprised of two flat membrane films which are separated from each other by a wave-shaped spacer that is made of the same material, but in an absolutely impervious form. The side of the membrane against which the medium (feed) to be separated flows has a flat, i.e., non-structured, surface. By contrast, DE 43 29 473 C1 describes a flat membrane whose geometry is embodied in such a way that tensile stresses do not occur at any point in the membrane. To this end, there are grooves on the filtrate side which have the approximate cross section of a semicircular arc.

WO 90/15661 describes a self-supporting ceramic membrane which is comprised of two layers containing one coarse powder and one fine powder. The manufacture is carried out by means of the superposed casting of the layers by means of tape casting technology. The support layer bond thus produced is fired on in one step. The above document also discloses that, in the unfired state, the membrane is flexible and can be embossed (e.g., channels).

U.S. Pat. No. 5,766,290 describes a ceramic filter comprised of specially structured plates (zigzag pattern), which are stacked in an offset manner and glued to each other, which produces parallel channels in this instance. The plates have a uniform, porous structure and are comprised of fragments of ceramic fibers. They are used as high temperature-stable and pressure-stable filters for lateral flow filtration of gases (flue gas, natural gas).

The disadvantages of this are the limited geometric design potential and the uniform porous structure, which stands in opposition to a broad application.

The disadvantages of the prior flat membranes as well as those in tubular geometries is that the membrane surface areas cannot be increased to arbitrarily high levels and that, with an increase of this kind, the mechanical stability decreases.

As is known, known membranes are primarily comprised of polymers. Despite having better properties (higher chemical, thermal, and mechanical stability), ceramic membranes have not yet been able to catch on due to higher production costs.

The prior technology for producing ceramic flat membranes is comprised of the following steps:

1. Production of the support
   Mixing of narrowly fractionated powders in the magnitude range of a few μm, with known shaping agents,
   Shaping,
   Sintering.
2. Production of a partial layer on the support
   Suspension production out of fine powders that are likewise fractionated as narrowly as possible, with grain sizes that are smaller than that of the support,
   Coating of the support by means of dip coating,
   Drying,
   Sintering, multiple repetitions of the last three steps
3. Production of another partial layer on the first partial layer
   Suspension production out of fine powders that are fractionated as narrowly as possible, with grain sizes that are smaller than those of the previously applied partial layer, or sol production,
   Coating of the first sintered partial layer by means of dip coating,
   Drying,
   Sintering, multiple repetitions of the last three steps
4. Production of the modules
   Sealing of the end pieces (sealing)
   Assembly.

It is clear from this description that the primary disadvantage of the known manufacturing process is the expensive repetition of the application, drying, and sintering of the partial layers. These manufacturing steps are particularly cost-intensive.

Research has already been done toward improving this manufacturing process by integrating the coating into the shaping process. This was attempted particularly in conjunction with coextrusion. In this connection, strand-shaped masses are extruded over a dome using a piston extruder (DE 22 08 767 C1).

However, the research was not continued and has not been used in actual practice. In any case, it is not always possible to produce multilayered elements in this manner.

SUMMARY OF THE INVENTION

The object of the invention is to provide a ceramic flat membrane in which an increase of the effective membrane surface area and thereby an improvement in the ratio of surface area to volume is achieved while maintaining the mechanical stability of the membranes, and these membranes can be produced using a more reasonably priced process.

The present invention is directed to a ceramic flat membrane, comprising at least two layers of equal thickness, each of said at least two layers being composed of at least two differently porous partial layers; at least one of said at least two layers having a non-planar geometry; and said at least two layers being attached to each other at least at points and through material adhesion forming a ceramic flat membrane having channels whose cross-sections have arbitrary geometries.

The present invention is also directed to a process for producing ceramic flat membranes, comprising producing ceramic suspensions from at least two ceramic powders having different particle sizes, or from at least one ceramic powder and at least one solution, which contains precursors of a ceramic material, through addition of additive, sintering agent, shaping agent, bonding agent, or dispersion agent, where particle size of the additives is not greater that the greatest particle size of the ceramic powder; forming at least one first partial layer out of one of the suspensions, and then entirely or partially removing dispersion fluid; forming at least one second partial layer comprised of the other suspension or solution, and entirely or partially removing dispersion fluid or solvent; forming at least one layer by at least one of superposing and attaching the at least one first partial layer and the least one second partial layer; embossing the at least one layer to form at least one embossed layer; attaching the at least one embossed layer at least at points and by material adhesion to at least one layer to form a flat ceramic membrane having channels whose cross-sections have arbitrary geometries; and sintering the flat ceramic membrane with the proviso that not all of the membrane components are sintered.

An average pore size of the layers can increase in a filtrate direction.

One layer of the at least two layers can have a planar geometry and another layer of the at least two layers can have a wavy geometry. Moreover, the at least two layers have a wavy geometry.

The channels can be a longitudinally oriented structure.

The cross-sections of the channels can be triangular, semicircular, wave-shaped, or trapezoidal.

The channels can comprise between 2 and 500 longitudinally oriented channels.

The at least two partial layers can comprise a coarsely pored partial layer and a finely pored partial layer, and a ratio of the thickness of the coarsely pored partial layer to the thickness of the finely pored partial layer can be from 5 to 10.

The at least two partial layers can comprise a finely pored partial layer and an even more finely pored partial layer, and the ratio of the thickness of the finely pored partial layer to the thickness of the even more finely pored partial layer can be from 1 to 10.

The at least two partial layers can comprise a coarsely pored partial layer and a finely pored partial layer, and the average pore diameter of the coarsely pored partial layer can be 2 to 10 times the average pore diameter of the finely pored partial layer.

The at least two partial layers can comprise a finely pored partial layer and an even more finely pored partial layer, and the average pore diameter of the finely pored partial layer can be 2 to 100 times the average pore diameter of an even more finely pored partial layer.

The at least two partial layers can comprise a coarsely pored partial layer and a finely pored partial layer, and the average particle diameter of the coarsely pored partial layer can be 2 to 10 times the average particle diameter of the finely pored partial layer.

The at least two partial layers can comprise a finely pored partial layer and an even more finely pored partial layer, and the average particle diameter of the finely pored partial layer can be 2 to 100 times the average particle diameter of an even more finely pored partial layer.

At least one of the partial layers can be a dense or nanoporous inorganic layer. The inorganic layer can be at least one of a metallic and ceramic layer. The dense or nanoporous layer can be deposited on a most finely pored partial layer.

At least one of the channels can have a different cross-sectional geometry. All of the channels can have different cross-section geometries. The channel cross-sectional geometries can periodically repeat.

At least one of the individual channels, all of the channels, and the entire flat membrane can have a twisted shape.

The at least two layers can be composed of at least two partial layers laminated to one another.

The channels can change in shape and dimension over length of the channels.

The ceramic powder can comprise at least one of oxidic and nonoxidic powders. The ceramic powder can comprise silicon carbide, aluminum oxide, or zirconium oxide.

The dispersion fluid can comprise water.

The bonding agent can comprise a mixture of at least polyvinyl alcohol and at least one thermoplastic substance. The at least one thermoplastic substance can comprise stearic acid or paraffin.

The sintering additive can comprise a glass.

The at least one solution that contains precursors of a ceramic material can comprise a sol.

The forming of the at least one partial layer can comprise forming the at least one partial layer by tape casting.

The layer can be formed by casting and drying a partial layer, and casting an additional partial layer thereon.

The embossing a partial layer can be performed simultaneously with depositing of the partial layer onto a second partial layer.

A ratio of a gap width of a slot-like opening for casting of a first partial layer to a gap width of a slot-like opening for casting of a second partial layer onto the first partial layer can be from 0.1 to 0.5, and this ratio can also apply to casting of additional partial layers.

The ceramic suspensions can comprise a fine-grained suspension and a coarse-grained suspension, and a ratio of an average particle diameter of the fine-grained suspension to an average particle diameter of the coarse-grained suspension can be from 0.1 to 0.5 and this ratio can also apply to additional suspensions.

Layer production can be executed continuously from a stationary container onto a moving supporting belt.

Layer production can be executed discontinuously from a moving container onto a stationary substrate, with the stationary substrate being a plate or a support film fixed to a plate.

A wavy, serrated, or structured plate or supporting belt can be used in the process.

The embossing can be performed continuously in a radial fashion using cylindrical dies with a curved negative contour.

The embossing can be performed discontinuously in a uniaxial fashion using flat dies with a flat negative contour.

The embossing can be performed using two respective opposing structured dies having a negative contour of respective two sides of layers to be embossed, with a distance between dies and contact pressure being varied.

Layers can be heated or cooled at least one of before, during and after embossing.

Layers can be moistened or dried at least one of before, during and after embossing.

Production of the flat membrane out of at least one embossed layer can be performed discontinuously in a uniaxial fashion using two flat dies, with one of them having a negative contour of embossing structure.

Production of the flat membrane out of at least one embossed layer can be performed continuously in a radial fashion using two cylindrical dies, with each of the dies having curved negative contour of respective embossing structure.

In order to produce the attachment, at least in points and through material adhesion, between two layers, two respective opposing dies with a negative contour of respective two surfaces of the flat membrane comprised of embossed and non-embossed layers can be used, with the distance between the dies and the contact pressure being varied.

At least one of embossed and non-embossed layers can be heated or cooled and/or moistened or dried at least one of before, during or after being attached to other embossed and/or non-embossed layers.

The embossing can be performed with embossing dies composed of a material with elastic properties.

The at least two ceramic powders can have the same or different compositions.

The attaching at least one embossed layer at least at points and by material adhesion to at least one layer can comprise attaching the at least one embossed layer to at least one layer wherein the at least one layer is embossed and sintered or unsintered, non-embossed, similarly embossed, differently embossed, or differently structured, sintered or non-sintered layer.

DETAILED DESCRIPTION OF THE INVENTION

The ceramic flat membrane according to the invention is comprised of at least two layers of equal thickness, each of these layers in turn being comprised of at least two partial layers. These two partial layers can differ from each other in terms of their material composition and structure or can also be the same. In each case, they differ in terms of their average pore size. Advantageously, the coarsely pored partial layers are disposed in the direction of the filtrate.

The term average pore size is understood to mean the size that relates to all of the average dimensions (in particular diameter, radius, cross-sectional surface area, volume) of the pores and also their average distribution.

The partial layers are advantageously connected to one another. The layers are advantageously connected to one another.

According to the invention, at least one of the layers has a non-planar geometry. In the context of this invention, the term planar geometry is understood to mean that the surfaces of the layers are flat or at least essentially flat. All surfaces of layers which are not flat or are essentially not flat consequently have a non-planar geometry. Due to the non-planar geometry of at least one of the layers, channels are produced in the ceramic flat membrane according to the invention, which can contain either the medium to be separated or the filtrate.

The cross-sections of these channels can have an arbitrary geometry and can also change continuously or discontinuously over the length of the channels and also over the volume of the flat membrane.

The flat membranes according to the invention have a membrane surface area that is many times the membrane surface area possible in known flat membranes. The membrane surface area can be six times greater than in a multi-channel element with 19 individual channels. In addition, a mechanical stability is achieved which is considerably higher than in conventional flat membranes.

A further advantage is that, due to the special form of the flat membrane according to the invention, when the medium to be filtered flows over it, turbulences and eddies are produced, which sharply limits the formation of a covering layer of dirt and other particles ("fouling"). Likewise, a removal of such a layer during filtration is encouraged.

This makes an increased permeation capacity and an extended service life of the flat membranes possible.

The process according to the invention makes it possible to produce the ceramic flat membranes according to the invention.

At least two layers are produced, which are comprised of at least two partial layers. These partial layers are cast, for example, as films; first the one partial layer is cast as a film and is completely or partially dried, and then the second film, which is made of the material for the second partial layer, is cast onto this layer and dried. The layer composite thus produced is left as a layer, for example, with a planar geometry, and is embossed as a second layer with a longitudinally oriented structure.

The two partial layers of the two layers can have the same or a different composition and/or structure. In each instance, though, they have a different average pore size.

After the production of the two layers, they are placed with their respective equally porous layers against each other and are attached to each other, at least at points, through frictional and/or material adhesion. This produces a ceramic flat membrane which can be a partial element of a module. This flat membrane is then sintered.

However, it is also possible according to the invention for the two layers to be sintered separately and only then be attached to each other.

EXAMPLES

The invention will be explained in detail below in several exemplary embodiments.

Example 1

Production of Suspension 1

100 g silicon carbide powder with an average particle diameter of 45 μm and 15 g borosilicate glass powder are dispersed in a solution of 12.9 g polyvinyl alcohol, 5.3 g glycerin, and 0.5 g nonanol as a defrothing agent in 65 g water. The dispersion is produced by stirring for 5 hours in a glass beaker by means of a propeller mixer.

Production of Suspension 2

100 g silicon carbide powder with an average particle diameter of 2 μm and 20 g borosilicate glass powder are dispersed in a solution of 15 g polyvinyl alcohol, 6.2 g glycerin, 0.05 g sodium polycarbonate as a dispersing agent, and 0.5 g nonanol as a defrothing agent in 65 g water. The dispersion is produced by stirring for 6 hours in a glass beaker by means of a propeller mixer.

Production of Layer 1

The suspension 1 is cast into a film on a tape casting apparatus. The casting height above the flat substrate is 0.8 mm. After a drying time of 4 h at room temperature, the suspension 2 is cast over this film with a casting height of 0.1 mm. After a drying time of 6 h at room temperature, a layer/film comprised of two partial layers/partial films is produced, which is then removed from the substrate.

Production of Layer 2

The production of layer 2 takes place analogously to the process for producing layer 1.

After the two layers are dry, squares measuring 100×100 mm$^2$ are cut out of the layer 1. The layer 2 is cut into rectangles measuring 100×134.5 mm$^2$. The larger layer pieces are embossed by being transported through two cylindrical dies with trapezoidally toothed surface structures rotating in opposite directions and thus end up with the dimensions 100×100 mm$^2$. Then the two layers, the one embossed and the one non-embossed, are attached to each other, their partial layers made of suspension 1 oriented toward each other.

This process produces a flat membrane with channels which have a trapezoidal cross-section.

The unfired flat membrane body is sintered in air at 950° C., which gives the flat membrane its final properties.

Example 2

Production of Suspension 1

65 g silicon carbide powder with an average particle diameter of 20 μm and 11.5 g borosilicate glass powder are dispersed in a solution of 9.8 g polyvinyl alcohol and 9.8 g polyethylene glycol in 42 g water. The dispersion is produced by stirring for 5 hours in a glass beaker by means of a propeller mixer. Then the suspension is degassed in a vacuum box at a pressure of 12 Pa.

Production of Suspension 2

50 g silicon carbide powder with an average particle diameter of 1 μm and 7.2 g borosilicate glass powder are dispersed in a solution of 6.5 g polyvinyl alcohol, 6.5 g polyethylene glycol, 0.1 g sodium polycarbonate as a dispersing agent in 32 g water. The dispersion is produced by steady motion in a closed vessel on a rolling apparatus. In addition to the suspension 50, the vessel also contains 10 mm diameter agate balls. After 2 hours of dispersion, the suspension is poured out through a sieve and is then degassed by means of ultrasound.

Production of Layer 1

The suspension 1 is cast into a film on a tape casting apparatus. The casting height above the flat substrate is 0.6 mm. After a drying time of 3 h at room temperature, the suspension 2 is cast over this film with a casting height of 0.09 mm. After a drying time of 6 h at room temperature, the layer/film thus comprised of two partial layers/partial films is then removed from the substrate.

Production of Layer 2

The production of layer 2 takes place analogously to the process for producing layer 1.

After the two layers are dry, squares measuring 100×100 mm$^2$ are cut out of both. The pieces of layer 2 are placed in a form, which is comprised of a 100×100 mm$^2$ frame and two press dies with a wavy surface, and are deformed with the application embossed pressure of 2 MPa. Then the two layers, the one embossed and the one non-embossed, are attached to each other, the partial layers made of suspension 1 oriented toward each other.

This process produces a flat membrane with channels which have a waveross-section. shaped cross-section.

The unfired flat membrane body is sintered in air at 950° C., which gives the flat membrane its final properties.

What is claimed is:

1. A ceramic flat membrane, comprising:
    at least two layers of equal thickness, each of said at least two layers being composed of at least two differently porous partial layers;
    at least one of said at least two layers having a non-planar geometry; and
    said at least two layers being attached to each other at least at points and through material adhesion forming a ceramic flat membrane having channels whose cross-sections have arbitrary geometries.

2. The ceramic flat membrane according to claim 1, wherein an average pore size of the layers increases in a filtrate direction.

3. The ceramic flat membrane according to claim 1, wherein one layer of said at least two layers has a planar geometry and another layer of said at least two layers has a wavy geometry.

4. The ceramic flat membrane according to claim 1, wherein said at least two layers have a wavy geometry.

5. The ceramic flat membrane according to claim 1, wherein the channels have a longitudinally oriented structure.

6. The ceramic flat membrane according to claim 1, wherein the cross-sections of the channels are triangular, semicircular, wave-shaped, or trapezoidal.

7. The ceramic flat membrane according to claim 1, wherein the channels comprise between 2 and 500 longitudinally oriented channels.

8. The ceramic flat membrane according to claim 1, wherein the at least two partial layers comprise a coarsely pored partial layer and a finely pored partial layer, and a ratio of the thickness of the coarsely pored partial layer to the thickness of the finely pored partial layer is from 5 to 10.

9. The ceramic flat membrane according to claim 1, wherein the at least two partial layers comprise a finely pored partial layer and an even more finely pored partial layer, and the ratio of the thickness of the finely pored partial layer to the thickness of the even more finely pored partial layer is from 1 to 10.

10. The ceramic flat membrane according to claim 1, wherein the at least two partial layers comprise a coarsely pored partial layer and a finely pored partial layer, and the average pore diameter of the coarsely pored partial layer is 2 to 10 times the average pore diameter of the finely pored partial layer.

11. The ceramic flat membrane according to claim 1, wherein the at least two partial layers comprise a finely pored partial layer and an even more finely pored partial layer, and the average pore diameter of the finely pored partial layer is 2 to 100 times the average pore diameter of an even more finely pored partial layer.

12. The ceramic flat membrane according to claim 1, wherein the at least two partial layers comprise a coarsely pored partial layer and a finely pored partial layer, and the average particle diameter of the coarsely pored partial layer is 2 to 10 times the average particle diameter of the finely pored partial layer.

13. The ceramic flat membrane according to claim 1, wherein the at least two partial layers comprise a finely pored partial layer and an even more finely pored partial layer, and the average particle diameter of the finely pored partial layer is 2 to 100 times the average particle diameter of an even more finely pored partial layer.

14. The ceramic flat membrane according to claim 1, wherein at least one of the partial layers is a dense or nanoporous inorganic layer.

15. The ceramic flat membrane according to claim 14, wherein the inorganic layer is at least one of a metallic and ceramic layer.

16. The ceramic flat membrane according to claim 14, wherein the dense or nanoporous layer is deposited on a most finely pored partial layer.

17. The ceramic flat membrane according to claim 1, wherein at least one of the channels has a different cross-sectional geometry.

18. The ceramic flat membrane according to claim 1, wherein all of the channels have different cross-sectional geometries.

19. The ceramic flat membrane according to claim 1, wherein the channel cross-sectional geometries periodically repeat.

20. The ceramic flat membrane according to claim 1, wherein at least one of the individual channels, all of the channels, and the entire flat membrane has a twisted shape.

21. The ceramic flat membrane according to claim 1, wherein the at least two layers are composed of at least two partial layers laminated to one another.

22. The ceramic flat membrane according to claim 1, wherein said channels change in shape and dimension over length of said channels.

23. A process for producing ceramic flat membranes, comprising:

producing ceramic suspensions from at least two ceramic powders having different particle sizes, or from at least one ceramic powder and at least one solution, which contains precursors of a ceramic material, through addition of additive, sintering agent, shaping agent, bonding agent, or dispersion agent, where particle size of the additives is not greater that the greatest particle size of the ceramic powder;

forming at least one first partial layer out of one of the suspensions, and then entirely or partially removing dispersion fluid;

forming at least one second partial layer comprised of the other suspension or solution, and entirely or partially removing dispersion fluid or solvent;

forming at least one layer by at least one of superposing and attaching the at least one first partial layer and the least one second partial layer;

embossing the at least one layer to form at least one embossed layer;

attaching the at least one embossed layer at least at points and by material adhesion to at least one layer to form a flat ceramic membrane having channels whose cross-sections have arbitrary geometries; and sintering the flat ceramic membrane with the proviso that not all of the membrane components are sintered.

24. The process according to claim 23, wherein the ceramic powder comprises at least one of oxidic and non-oxidic powders.

25. The process according to claim 23, wherein the ceramic powder comprises silicon carbide, aluminum oxide, or zirconium oxide.

26. The process according to claim 23, wherein the dispersion fluid comprises water.

27. The process according to claim 23, wherein the bonding agent comprises a mixture of at least polyvinyl alcohol and at least one thermoplastic substance.

28. The process according to claim 27, wherein the at least one thermoplastic substance comprises stearic acid or paraffin.

29. The process according to claim 23, wherein the sintering additive comprises a glass.

30. The process according to claim 23, wherein the at least one solution that contains precursors of a ceramic material comprises a sol.

31. The process according to claim 23, the forming of the at least one partial layer comprises forming the at least one partial layer by tape casting.

32. The process according to claim 23, wherein the layer is formed by casting and drying a partial layer, and casting an additional partial layer thereon.

33. The process according to claim 23, wherein the embossing a partial layer is performed simultaneously with depositing of the partial layer onto a second partial layer.

34. The process according to claim 23, wherein a ratio of a gap width of a slot opening for casting of a first partial layer to a gap width of a slot opening for casting of a second partial layer onto the first partial layer is from 0.1 to 0.5, and this ratio also applies to casting of additional partial layers.

35. The process according to claim 23, wherein the ceramic suspensions comprise a fine-grained suspension and a coarse-grained suspension, and a ratio of an average particle diameter of the fine-grained suspension to an average particle diameter of the coarse-grained suspension is from 0.1 to 0.5 and this ratio also applies to additional suspensions.

36. The process according to claim 23, wherein layer production is executed continuously from a stationary container onto a moving supporting belt.

37. The process according to claim 23, wherein layer production is executed discontinuously from a moving container onto a stationary substrate, with the stationary substrate being a plate or a support film fixed to a plate.

38. The process according to claim 23, including a wavy, serrated, or structured plate or supporting belt.

39. The process according to claim 23, wherein the embossing is performed continuously in a radial fashion using cylindrical dies with a curved negative contour.

40. The process according to claim 23, wherein the embossing is performed discontinuously in a uniaxial fashion using flat dies with a flat negative contour.

41. The process according to claim 23, wherein the embossing is performed using two respective opposing structured dies having a negative contour of respective two sides of layers to be embossed, with a distance between dies and contact pressure being varied.

42. The process according to claim 23, comprising heating or cooling layers at least one of before, during and after embossing.

43. The process according to claim 23, comprising moistening or drying layers at least one of before, during and after embossing.

44. The process according to claim 23, wherein production of the flat membrane out of at least one embossed layer is performed discontinuously in a uniaxial fashion using two flat dies, with one of them having a negative contour of embossing structure.

45. The process according to claim 23, wherein production of the flat membrane out of at least one embossed layer is performed continuously in a radial fashion using two cylindrical dies, with each of the dies having curved negative contour of respective embossing structure.

46. The process according to claim 23, wherein, in order to produce the attachment, at least in points and through material adhesion, between two layers, two respective opposing dies with a negative contour of respective two surfaces of the flat membrane comprised of embossed and non-embossed layers are used, with the distance between the dies and the contact pressure being varied.

47. The process according to claim 23, wherein at least one of embossed and non-embossed layers are heated or cooled and/or moistened or dried at least one of before, during or after being attached to other embossed and/or non-embossed layers.

48. The process according to claim 23, wherein embossing is performed with embossing dies composed of a material with elastic properties.

49. The process according to claim 23, wherein said at least two ceramic powders have a same composition.

50. The process according to claim 23, wherein said at least two ceramic powders have different compositions.

51. The process according to claim 23, wherein the attaching the at least one embossed layer at least at points and by material adhesion to at least one layer comprises attaching the at least one embossed layer to at least one layer wherein the at least one layer is embossed and sintered or unsintered, non-embossed, similarly embossed, differently embossed, or differently structured, sintered or non-sintered layer.

* * * * *